(12) United States Patent
Pusheck et al.

(10) Patent No.: US 10,883,863 B2
(45) Date of Patent: Jan. 5, 2021

(54) INTERCHANGEABLE SENSOR MOUNTING

(71) Applicant: Autoliv ASP, Inc., Ogden, UT (US)

(72) Inventors: Jacob Pusheck, Waterford, MI (US); Joshua Forwerck, Royal Oak, MI (US)

(73) Assignee: VEONEER US, INC., Southfield, MI (US)

( * ) Notice: Subject to any disclaimer, the term of this patent is extended or adjusted under 35 U.S.C. 154(b) by 159 days.

(21) Appl. No.: 15/818,941

(22) Filed: Nov. 21, 2017

(65) Prior Publication Data
US 2019/0154470 A1 May 23, 2019

(51) Int. Cl.
*G01D 11/24* (2006.01)
*G01D 11/30* (2006.01)

(52) U.S. Cl.
CPC .......... *G01D 11/245* (2013.01); *G01D 11/30* (2013.01)

(58) Field of Classification Search
CPC .............................. G01D 11/245; G01D 11/30
USPC .......................................... 73/431, 493, 756
See application file for complete search history.

(56) References Cited

U.S. PATENT DOCUMENTS

| | | | | |
|---|---|---|---|---|
| 5,945,606 A * | 8/1999 | Tokunaga | ............... | B60C 23/04 374/E1.018 |
| 10,203,228 B2 * | 2/2019 | Forwerck | ............ | B60R 16/0231 |
| 10,451,645 B2 * | 10/2019 | Pusheck | .................... | G01P 1/02 |
| 2009/0300893 A1 * | 12/2009 | Herrmann | ............... | B60R 11/02 24/595.1 |
| 2011/0107835 A1 * | 5/2011 | Campbell | ......... | B29C 45/14655 73/488 |
| 2014/0265740 A1 * | 9/2014 | Franci | ..................... | G01P 1/023 310/68 B |
| 2015/0258953 A1 * | 9/2015 | Murray, Jr. | ............. | B60R 21/01 73/493 |
| 2015/0377193 A1 * | 12/2015 | Smith | .............. | F02M 35/10249 123/184.21 |
| 2016/0061682 A1 * | 3/2016 | Ramsay | .............. | G01L 19/0069 73/706 |
| 2016/0139168 A1 | 5/2016 | Ludwig et al. | | |
| 2018/0052019 A1 * | 2/2018 | Ghannam | ............ | G01D 11/245 |

* cited by examiner

*Primary Examiner* — Nimeshkumar D Patel
*Assistant Examiner* — Jean F Morello
(74) *Attorney, Agent, or Firm* — Dickinson Wright PLLC (57) ABSTRACT

A mountable sensor assembly for mounting on the sheet metal of a vehicle assembly. The mountable sensor assembly may include a sensor circuit and a sensor housing. The sensor housing may include a first portion with a cavity that receives the sensor circuit and a second portion that includes an anti-rotation tab. The sensor housing having a locking interface that fixes the location and orientation of first portion to the second portion.

20 Claims, 6 Drawing Sheets

FIG-5

INTERCHANGEABLE SENSOR MOUNTING

BACKGROUND

The present application relates generally to a sensor assembly configured to interface with attachments having different mounting feature arrangements.

BRIEF SUMMARY

In satisfying the above need, as well as overcoming the enumerated drawbacks and other limitations of the related art, the present application provides a sensor assembly configured to interface with various attachments having different mounting feature arrangements, for example various anti-rotation tab attachments.

Most sensor devices require specific molded features in order to meet the specification for customers defined mounting features. This generates a large number of variations of sensor housing designs and mounting features. To avoid making a new mold for each customer and to increase efficiency of manufacturing, it may be advantageous to have one housing that meets all customer needs by allowing for varying mounting features per customer request. The implementation discussed in this application provides a system by which the sensor can be fitted with a customer specific feature(s) that can allow the base sensor to be mounted to a variety of customer sheet metal patterns.

A generic housing can be produced in such a way that mounting features can be added to it via an interchangeable cover to allow it to mate with various customer sheet metal mounting patterns. The attached features may include an anti-rotation tab, and/or fastener aperture, which may include a metal bushing (compression limiter). The implementations provided also describe methods of connection between these two components such that they join to make a robust and accurate sensor unit. The base housing unit may function as a pocket into which the PCB or sensing component can be inserted. The base housing unit may also contain a mating connector with electrical connection pins which attach to the sensor in some way.

The interchangeable cover with mounting features may come in a variety of types. However, generally they contain anti-rotation tabs and/or fastener apertures. The mounting features function as the sensor's interface with the vehicle mounting sheet metal. The interchangeable cover with mounting features may also seal off the base housing units' sensor pocket to protect the sensor from environmental intrusion.

In some implementations, the base housing unit may contain features that allow for an anti-rotation tab to be attached easily to the housing and locked into a specific location. In some implementations, an anti-rotation tab may be welded on the cover. The base housing unit may contain features to force the cover to be installed in one orientation. These features may also provide mechanical retention to the cover to resist against twisting of the cover. A cover using this design may allow for multiple mounting feature locations and orientations, but provide a consistent seal to prevent the environment from interacting with the electronic components within the base housing unit.

In some implementations, the base housing unit may only contain a pocket for which to seat the sensing unit and a connector as a means for electrical connection to the vehicle. The interchangeable mounting feature may assist in sealing off the sensor pocket, containing an anti-rotation feature, providing a fastener aperture with a compression limiting bushing, and constraining the sensing component within the pocket.

In general, the implementations described are related to a mountable sensor assembly for mounting on the sheet metal of a vehicle assembly. The mountable sensor assembly may include a sensor circuit and a sensor housing. The sensor housing may include a first part with a cavity that receives the sensor circuit and a second part that includes an anti-rotation tab. The sensor housing having a locking interface that fixes the location and orientation of first part to the second part.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

In the accompanying drawings the components are not necessarily to scale, emphasis instead being placed upon illustrating the principles of the application. Moreover, like reference numerals designate corresponding parts throughout the views.

DETAILED DESCRIPTION

Figure 1A:
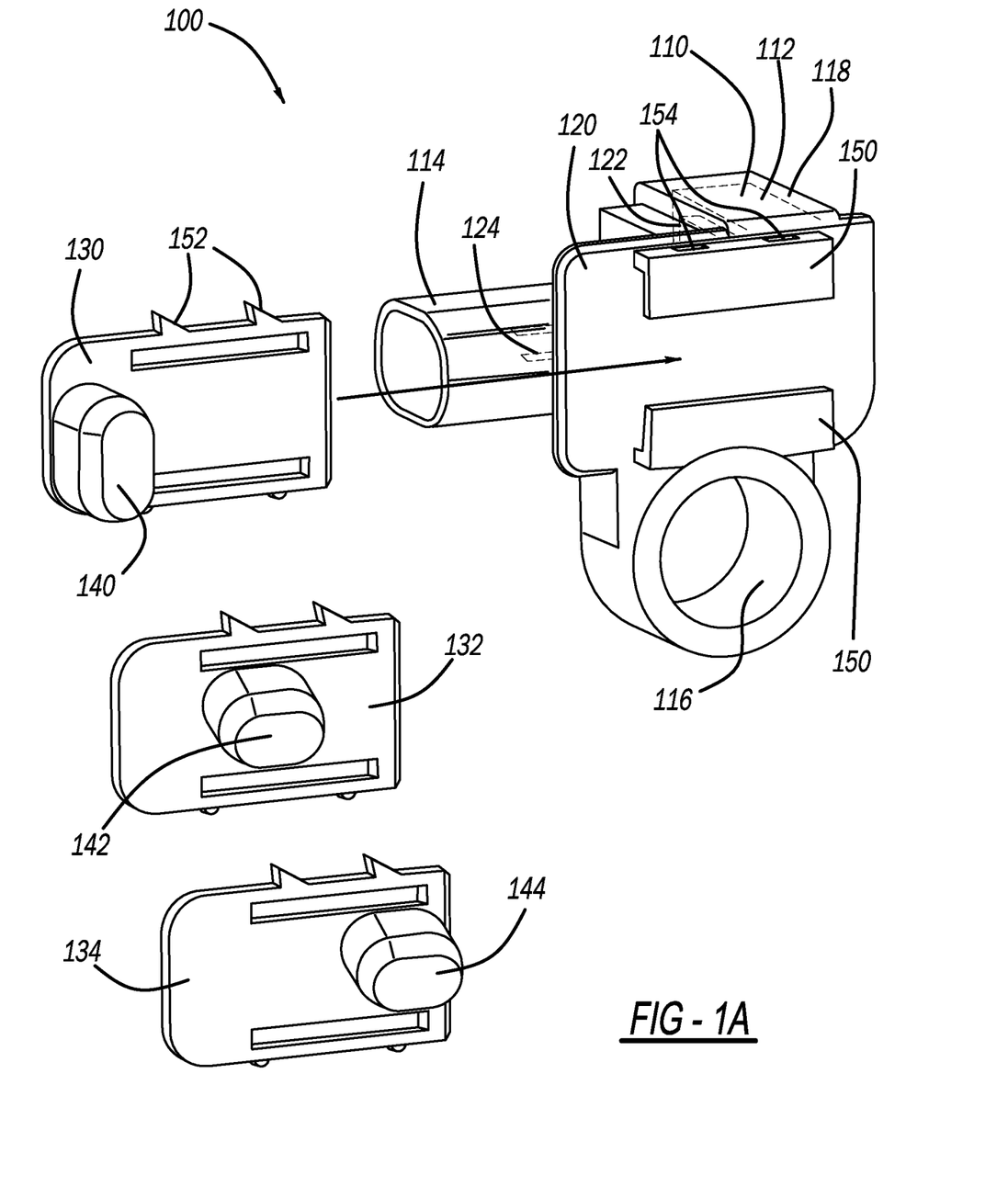
FIG. 1a is an exploded perspective view of a sensor assembly configured to interface with various anti-rotation tab attachments.
Figure 1B:
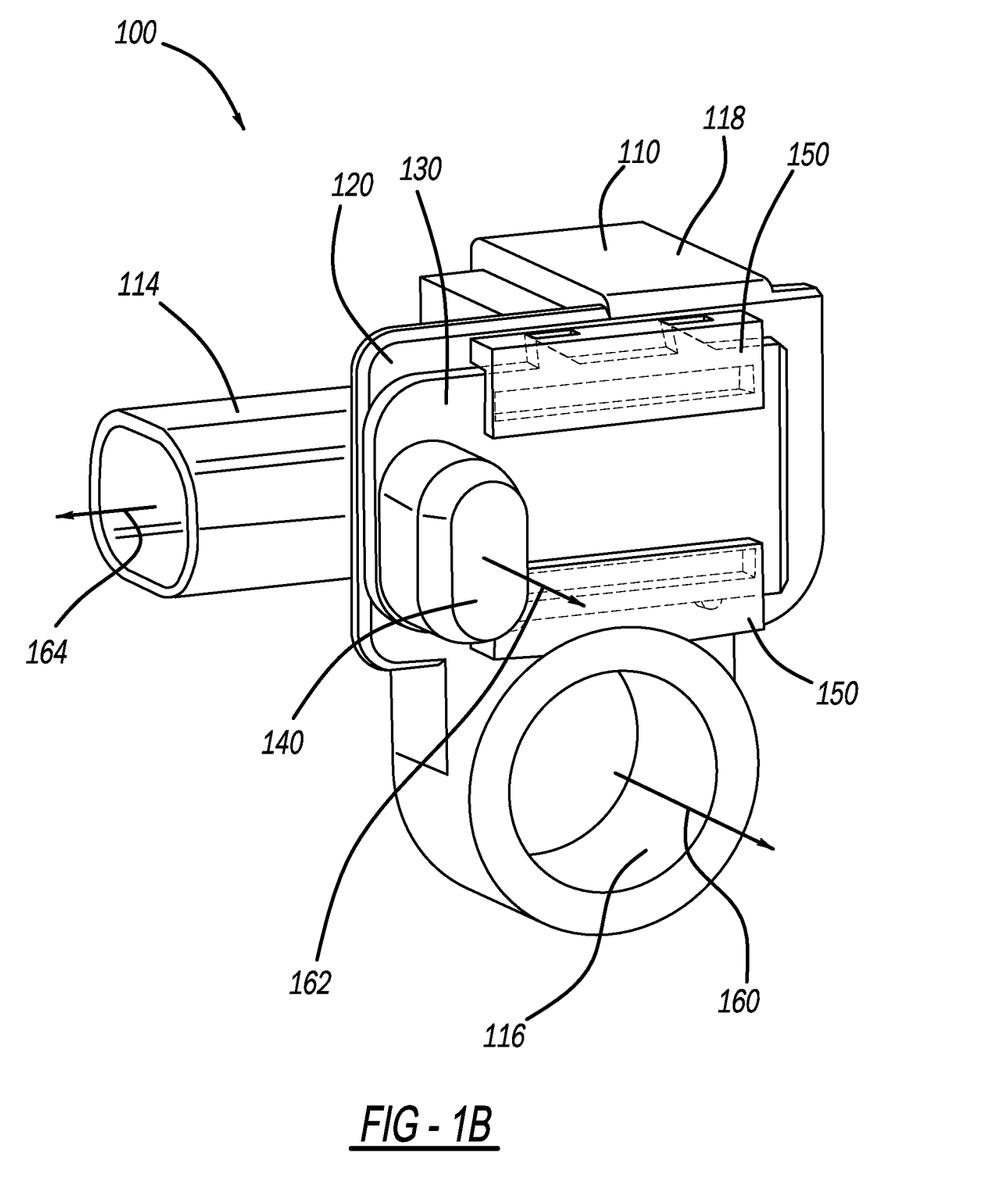
FIG. 1b is a perspective view of a sensor assembly configured to interface with various anti-rotation tab attachments.

FIG. 1a is an exploded view of a sensor assembly 100 with interchangeable attachment members 130, 132, and 134. FIG. 1b is an illustration of the sensor assembly 100 integrated with the interchangeable attachment member 130. The sensor assembly may have a housing 110 including a cavity 112 for housing a sensor 122. The sensor may be an accelerometer, pressure sensor, gyroscope, sound sensor, or other sensor. A gasket and/or potting may also be included in the cavity to protect the sensor from various elements. The interchangeable attachment 130 may be a cover to be placed over the cavity 112 to seal the sensor 122 from external conditions. The cavity 112 may include access to one or more pins 124. The pins may extend from the cavity into a connector 114 extending from a base portion 118 of the housing 110. A mounting portion 116 with a fastener aperture may extend from the base portion of the housing 110. In some implementations, the housing 110, as well as, the connector 114 and mounting portion 116 may be injection molded of a unitary piece. The position of the mounting portion 116 relative to an orientation feature, such as anti-rotation tab 140, as well as, possibly the connector 114 may be defined by one or more standards in the industry. The housing 110 may include a surface 120 that engages the attachment 130, which includes anti-rotation tab 140. The attachment 130 may be fastened to the surface 120 via various means such as locking features, plastic welding, snap fit features, compression fit features, ratcheting features, or adhesive. In one example, locking features, barbs 152, of the attachment 130 engage corresponding locking features, openings 154 in clips 150, of the housing 110 to lock the position and orientation of the attachment 130 relative to the housing 110. Slots 156 allow the barbs 152 to flex when passing through clips 150 until the barbs 152 are inserted in the openings 154. The locking features may be clips and/or snap fit features on either the housing 110 or the attachment 130. By locking the attachment 130 relative to the housing 110, the location and orientation of the anti-rotation tab 140 may be locked relative to the mounting portion 116 and/or the connector 114. The locking features, for example barbs 150, may be located on the housing 110. However, locking features, such as barbs 150, may be provided on the attachment 130 to engage the housing 110 to lock the position and orientation of the attachment 130 relative to the housing 110. In some implementations, both components may have corresponding locking features that engage one another.

The locking features 150 may be positioned to interface and engage multiple attachments like the illustrated attachment 130. Each attachment may have a different location and orientation of the locking tab (e.g. 140) to meet each of the different anti-rotation position and orientation definitions provided in various standards. As such, the housing 110 may be used for each of three or more different assemblies called out in a specification by merely reconfiguring the sensor and locking on the proper attachment that provides the appropriate position and location of the required mounting features and connector 114, for example the connector 114.

The orientation of the mounting portion 116, the anti-rotation tab 140, and the connector 114 may have specific pre-defined relationships. For example, the longitudinal axis 162 of the anti-rotation tab 140 may be oriented parallel to the longitudinal axis 160 of the fastener aperture of the mounting portion 116. Further, the longitudinal axis 162 of the anti-rotation tab 140 may be oriented perpendicular to the longitudinal axis 164 of the connector 114. These relationships may be maintained in each of the implementations discussed herein.

Alternate attachment configurations are shown with regard to attachment 132 and attachment 134. Attachment 132 has anti-rotation tab 142 located in a different location than anti-rotation tab 140. Further, attachment 134 has anti-rotation tab 144 in yet a different location than both anti-rotation tab 140 and anti-rotation tab 142. In this way, three sensors may be mounted in different configurations using the same housing 110, but different attachments 130, 132, and 134.

Figure 2:
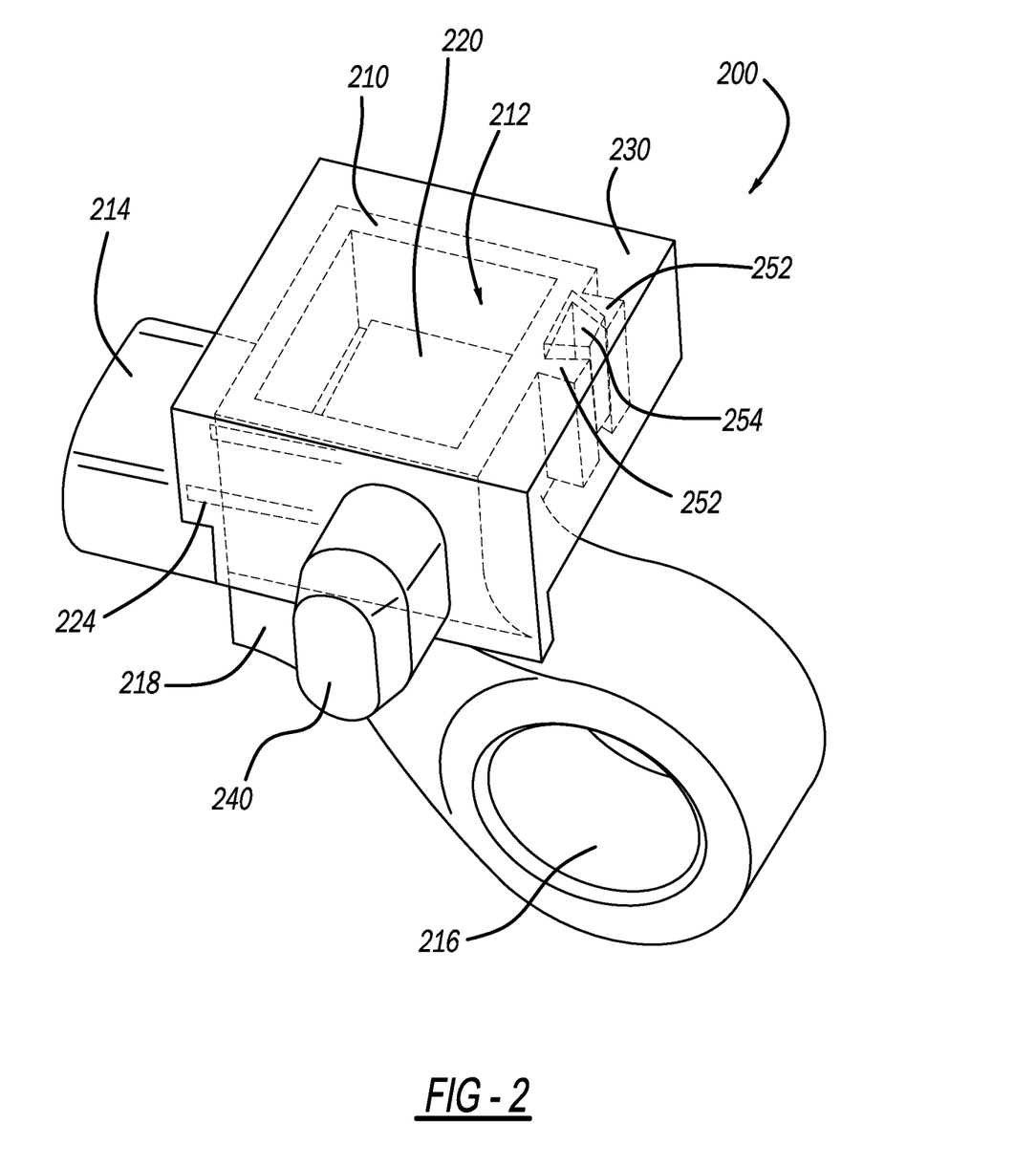
FIG. 2 is a perspective view of a sensor assembly configured to interface with cover that includes an anti-rotation tab.

FIG. 2 is an illustration of a sensor assembly 200 with an interchangeable anti-rotation tab 240 attached to a cover 230. The sensor assembly 200 may have a housing 210 including a cavity 212 for housing a sensor 220. The sensor 220 may be an accelerometer, pressure sensor, gyroscope, sound sensor, or other sensor. A gasket and/or potting may also be included in the cavity 212 to protect the sensor 220 from various elements. The cover 230 may be placed over the cavity 212 to seal the sensor 220 from external conditions. The cavity 212 may include access to one or more pins 224. The pins 224 may extend from the cavity 212 into a connector 214 that extends from a base portion 218 of the housing 210. A mounting portion 216 may extend from the base portion 218 of the housing 210. In some implementations, the housing 210 as well as the connector 214 and mounting portion 216 may be injection molded of a unitary piece. The position of the mounting portion 216 relative to the connector 214 as well as an anti-rotation tab 240 may be defined by one or more standards in the industry.

The cover 230 may include an anti-rotation tab 240. The cover 230 may be fastened to the housing 210 via various means such as locking features, plastic welding, snap fit features, compression fit features, ratcheting features, or adhesive. For example, locking features, such as a dovetail slot 252 on the housing 210 may engage the locking features, such as a dovetail 254 on the cover 230 to lock the position and orientation of the cover 230 relative to the housing 210. By locking the cover 230 relative to the housing 210, the location and orientation of the anti-rotation tab 240 may be locked relative to the connector 214 and/or the mounting portion 216. The locking features may be located on the housing or locking features may be provided on the cover 230. In some implementations, both components may have corresponding locking features that engage one another.

The locking features, such as dove tail 254, may serve at least three purposes. First, the locking features may fasten the cover 230 to the housing 210. Second, the locking features may fix the position and orientation of the cover 230 to the housing 210. Third, the locking features may serve to limit which cover 230 may be paired with which housing 210.

The locking features may be positioned to interface and engage multiple covers like the illustrated cover 230. The locking features may be clips and/or snap fit features on either the housing 210 or the cover 230. Each cover may have a different location and orientation of the anti-rotation tab (e.g. 240) to meet each of the different anti-rotation position and orientation definitions provided in various standards. As such, the housing 210 may be used for each of three or more different assemblies called out in a specification by merely reconfiguring the sensor 220 and locking on the proper cover that provides the appropriate position and location of the anti-rotation tab 240 relative to the mounting portion 216 and connection 214.

Figure 3:
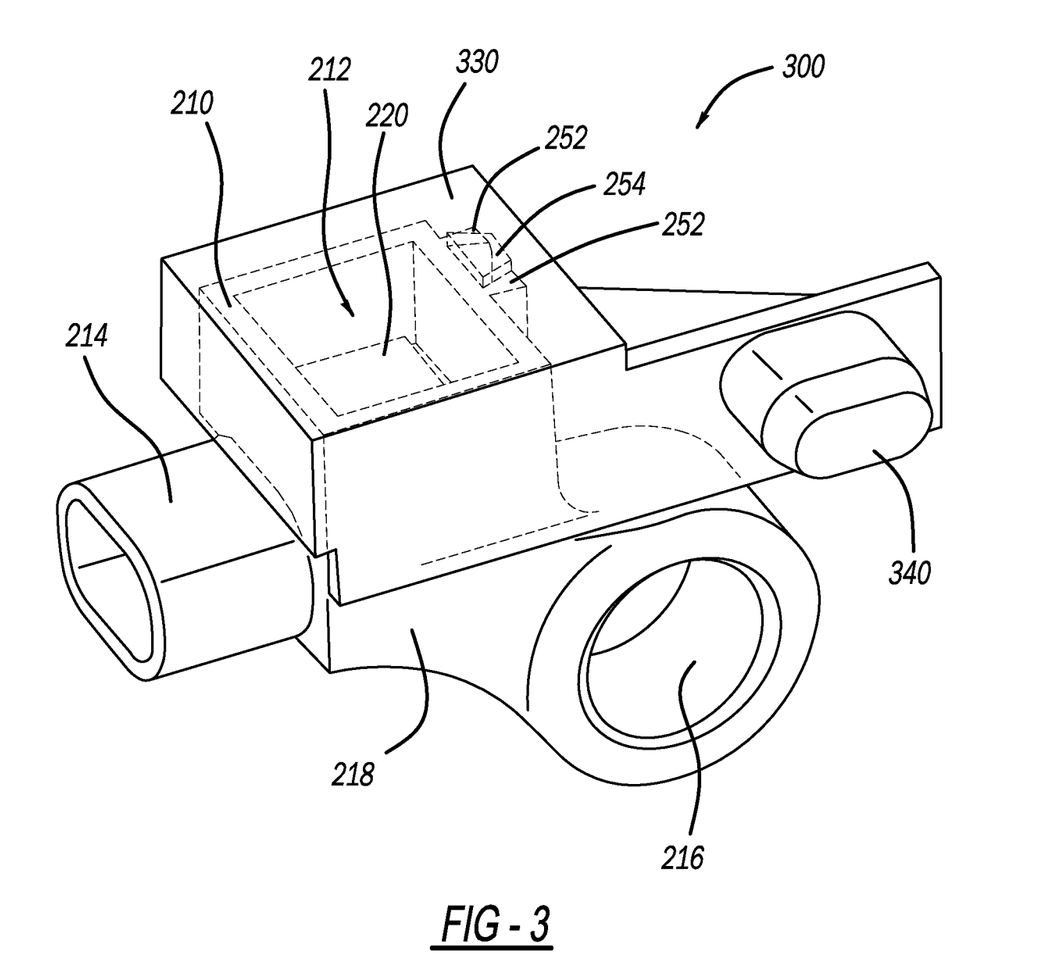
FIG. 3 is a perspective view of the sensor assembly attached to another cover that includes an anti-rotation tab in an alternate position.

FIG. 3 is an illustration of a sensor assembly 300 with a different interchangeable cover 330 including an anti-rotation tab 340. In this implementation, the anti-rotation tab 340 is located on an extended portion of the cover 330, extending away from the cavity 212. The sensor assembly 300 may have a housing 210 including a cavity 212 for housing a sensor 220. The sensor 220 may be an accelerometer, pressure sensor, gyroscope, sound sensor, or other sensor. A connector 214 may extend from a base portion 218 of the housing 210 and provide electrical connections to the sensor. A mounting portion 216 may extend from a base portion of the housing 210. In some implementations, the housing 210, as well as, the connector 214 and mounting portion 216 may be injection molded of a unitary piece. The housing 210 may interface with a cover 330 that includes anti-rotation tab 340. The cover 330 may be fastened to the housing 210 via various means such as locking features, plastic welding, snap fit features, compression fit features, or adhesive. In one example, locking features 252 of the housing 210 engage the locking features 254 of the cover 330 to lock the position and orientation of the cover 330 relative to the housing 210. By locking the cover 330 relative to the housing 210, the location and orientation of the anti-rotation tab 340 may be locked relative to the connector 214 and/or the mounting portion 216. The locking features may be located on the housing 210 and/or locking features may be provided on the cover 330 to engage the housing 210 to lock the position and orientation of the cover 330 relative to the housing 210. The locking features may be positioned to interface and engage multiple covers like the illustrated cover 330. Each cover may have a different location and orientation of the locking tab to meet each of the different anti-rotation position and orientation definitions provided in various standards. As such, the housing 210 may be used for each of three different assemblies called out in the specification by merely reconfiguring the sensor and locking on the proper cover that provides the appropriate position and location of the anti-rotation tab relative to the mounting portion 216 and connector 214.

Figure 4:
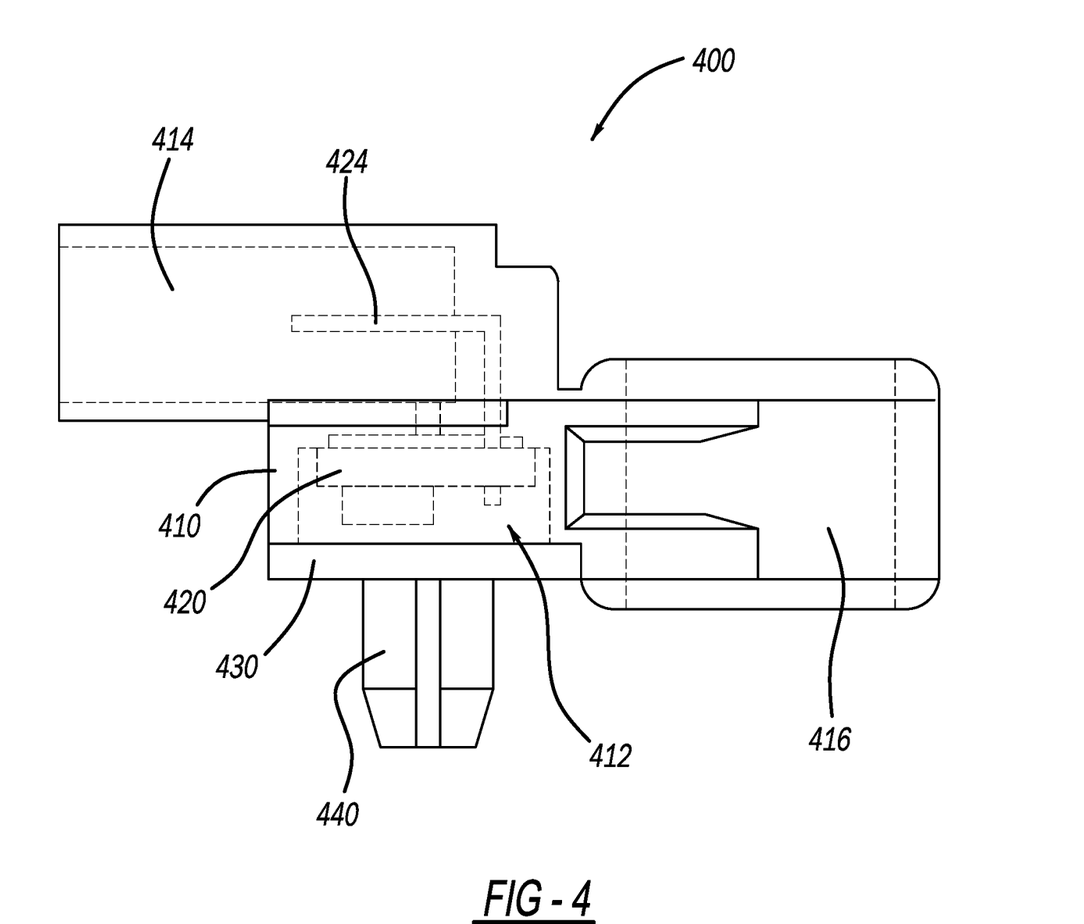
FIG. 4 is a side view of the sensor assembly attached to another cover that includes an anti-rotation tab in another alternate position.

FIG. 4 is an illustration of yet another sensor assembly with an interchangeable cover including an anti-rotation tab. In this implementation, the anti-rotation tab 440 is on a portion of the cover 430 directly over the cavity 412. As such, the opening of the cavity 412 faces the sheet metal. The sensor assembly may have a housing 410 including a cavity 412 for housing a sensor 420. The sensor 420 may be an accelerometer, pressure sensor, gyroscope, sound sensor, or other sensor. A connector 414 may extend from a base portion 418 of the housing 410 and provide electrical connections to the sensor 420. A mounting portion 416 may extend from a base portion 418 of the housing 410. The mounting portion 416 may include a mounting hole. In some implementations, the housing 410, as well as, the connector 414 and mounting portion 416 may be injection molded of a unitary piece. The housing 410 may interface with a cover 430 that includes anti-rotation tab 440. The cover 430 may be fastened to the housing 410 via various means such as locking features, plastic welding, snap fit features, compression fit features, or adhesive. In one example, locking features of the housing 410 the cover 430 to lock the position and orientation of the cover 430 relative to the housing 410. By locking the cover 430 relative to the housing 410, the location and orientation of the anti-rotation tab 440 may be locked relative to the connector 414 and/or the mounting portion 416. The locking features may be located on the housing 410 and/or locking features may be provided on the cover 430 to engage the housing 410 to lock the position and orientation of the cover 430 relative to the housing 410. In some implementations, both components may have corresponding locking features that engage one another. The locking features may be positioned to interface and engage multiple covers like the illustrated cover 430. Each cover may have a different location and orientation of the locking tab to meet each of the different anti-rotation position and orientation definitions provided in various standards. As such, the housing 410 may be used for each of three different assemblies called out in the specification by merely reconfiguring the sensor and locking on the proper cover that provides the appropriate position and location of the anti-rotation tab relative to the mounting portion 416 and connector 414.

Figure 5:
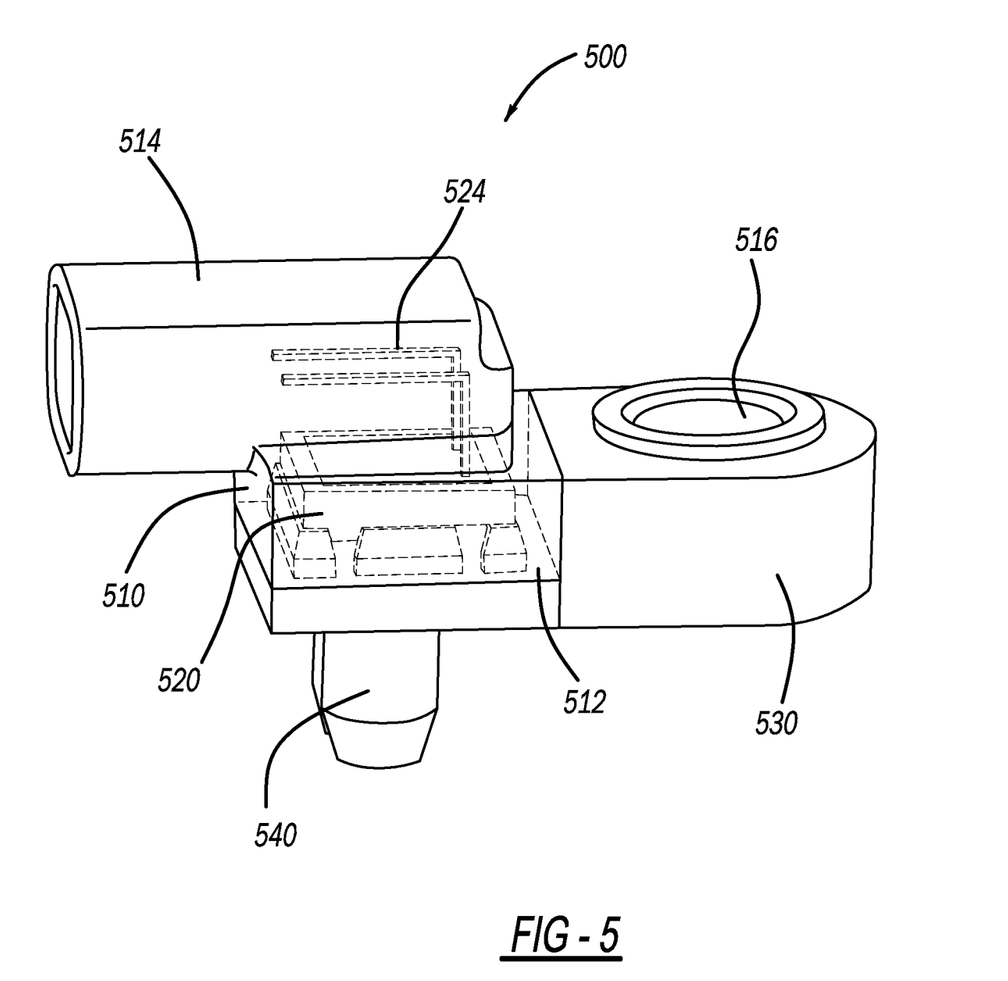
FIG. 5 is a perspective view of a sensor assembly configured to interface with mounting hole and anti-rotation tab component.

FIG. 5 is an illustration of one implementation of the sensor assembly where the mounting bushing 516 and the anti-rotation tab 540 are formed of an integral piece of a mounting portion 530. The housing 510 may include a cavity 512 for housing 510 the sensor 520 and pins that extend from the cavity 512 into a connector 514 for connecting the sensor 520 to an external wire harness. The mounting portion 530 may be fastened to the housing 510 by various means, such as locking features, plastic welding, snap fit features, compression fit features, ratcheting features, or adhesive. As such, the housing 510 may include locking features that fix the position and orientation of the housing 510 relative to the bushing assembly 530. As such, the connector 514 will be fixed in position and orientation relative to both the mounting portion 530 (e.g. bushing assembly) and the anti-rotation tab 540 through the locking features. In some implementations, the mounting portion 530 (e.g. a bushing assembly) may include locking features that engage the housing 510 to lock the position and orientation of the housing 510 and therefore the connector 514 relative the mounting portion 530. In some implementations, a portion of the mounting portion 530 may form a cover to seal the cavity 512 of the housing 510 that contains the sensor 520. As such, the locking features may also provide a sealing pressure between the housing and a surface of the mounting portion 530 to protect the sensor from external environment conditions.

As a person skilled in the art will readily appreciate, the above description is meant as an illustration of the principles of this application. This description is not intended to limit the scope or application of the claim in that the assembly is susceptible to modification, variation and change, without departing from spirit of this application, as defined in the following claims.

What is claimed is:

1. A mountable sensor assembly for mounting on sheet metal of a vehicle assembly, the mountable sensor assembly comprising:
   a sensor circuit; and
   a sensor housing comprising a first part with a cavity that receives the sensor circuit and a second part that includes a first orientation feature, the sensor housing having a locking feature that fixes a location and an orientation of the first part to the second part,
   wherein the second part is removably attached to the first part of the sensor housing such that the second part of the sensor housing is interchangeable.

2. The mountable sensor assembly according to claim 1, wherein the second part includes a mounting hole.

3. The mountable sensor assembly according to claim 1, further comprising a mounting portion that includes a second orientation feature and extends from the first part of the sensor housing.

4. The mountable sensor assembly according to claim 1, wherein the first part includes a mounting hole.

5. The mountable sensor assembly according to claim 1, wherein the locking feature includes a barb that engages an opening in the sensor housing.

6. The mountable sensor assembly according to claim 1, wherein the locking feature includes a dovetail that engages the sensor housing.

7. The mountable sensor assembly according to claim 1, wherein the first part is fixed to the second part by a plastic welding.

8. The mountable sensor assembly according to claim 1, wherein a longitudinal axis of the first orientation feature is oriented parallel to a longitudinal axis of a mounting hole.

9. The mountable sensor assembly according to claim 1, wherein the first part comprises a connector and a longitudinal axis of the first orientation feature is oriented perpendicular to a longitudinal axis of the connector.

10. A mountable sensor assembly for mounting on sheet metal of a vehicle assembly, the mountable sensor assembly comprising:
    a sensor circuit;
    a sensor housing comprising a cavity that receives the sensor circuit and a mounting surface; and an attachment having an anti-rotation tab that removably attaches to the sensor housing through a locking feature that fixes a location and an orientation of the attachment relative to the sensor housing.

11. The mountable sensor assembly according to claim 10, wherein the sensor housing is fixed to the attachment through barbs that engage openings in the sensor housing.

12. The mountable sensor assembly according to claim 11, wherein the attachment includes slots that allow the barbs to flex prior to engaging the openings.

13. The mountable sensor assembly according to claim 10, wherein the sensor housing includes a mounting hole.

14. The mountable sensor assembly according to claim 13, wherein a longitudinal axis of the anti-rotation tab is oriented parallel to a longitudinal axis of the mounting hole.

15. The mountable sensor assembly according to claim 14, wherein the sensor housing comprises a connector and the longitudinal axis of the anti-rotation tab is oriented perpendicular to a longitudinal axis of the connector.

16. A mountable sensor assembly for mounting on sheet metal of a vehicle assembly, the mountable sensor assembly comprising:
    a sensor circuit;
    a sensor housing comprising a cavity having an opening that receives the sensor circuit and a mounting surface; and
    an interchangeable cover configured to seal the opening in the cavity, the interchangeable cover having an anti-rotation tab, the cover removably attaching to the sensor housing through a locking feature that fixes a location and an orientation of the anti-rotation tab relative to the sensor housing.

17. The mountable sensor assembly according to claim 16, wherein the sensor housing is fixed to the cover through a dovetail interface.

18. The mountable sensor assembly according to claim 16, further comprising an alternate cover that includes an alternate anti-rotation tab located in a different position than the anti-rotation tab on the interchangeable cover, the locking feature fixing a location and an orientation of the sensor housing to the alternate cover.

19. The mountable sensor assembly according to claim 16, wherein a longitudinal axis of the anti-rotation tab is oriented parallel to a longitudinal axis of a mounting hole in the sensor housing.

20. The mountable sensor assembly according to claim 19, wherein the sensor housing comprises a connector and the longitudinal axis of the anti-rotation tab is oriented perpendicular to a longitudinal axis of the connector.

* * * * *